US012597767B2

(12) United States Patent
Ghassempour Aghamolki et al.

(10) Patent No.: US 12,597,767 B2
(45) Date of Patent: *Apr. 7, 2026

(54) NETWORK PROTECTOR THAT DETECTS AN ERROR CONDITION

(71) Applicant: Eaton Intelligent Power Limited, Dublin (IE)

(72) Inventors: Hossein Ghassempour Aghamolki, Edina, MN (US); Swaroop Gajare, Cranberry Township, PA (US); Amal Thomas, Changanassery (IN); Amit Govind Kolge, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 421 days.

This patent is subject to a terminal disclaimer.

(21) Appl. No.: 17/960,270

(22) Filed: Oct. 5, 2022

(65) Prior Publication Data

US 2023/0136795 A1 May 4, 2023

Related U.S. Application Data

(60) Provisional application No. 63/272,941, filed on Oct. 28, 2021.

(51) Int. Cl.
| | |
|---|---|
| *H02H 7/00* | (2006.01) |
| *H02H 1/00* | (2006.01) |
| *H02H 7/22* | (2006.01) |

(52) U.S. Cl.
CPC ............ *H02H 7/22* (2013.01); *H02H 1/0007* (2013.01)

(58) Field of Classification Search
None
See application file for complete search history.

(56) References Cited

U.S. PATENT DOCUMENTS 5,701,226 A * 12/1997 Gelbien ................. H02H 7/262
361/65
6,160,690 A 12/2000 Matsumoto et al.
(Continued)

FOREIGN PATENT DOCUMENTS

CN       104836455 A       8/2015
CN       111651845 A       9/2020
(Continued)

OTHER PUBLICATIONS

Avinash Aithal et al. "Performance of an electrical distribution network with Soft Open Point during a grid side AC fault" Applied Energy. vol. 227. pp. 262-272. ISSN 0306-2619. Accessible at: https://www.sciencedirect.com/science/article/pii/S0306261917311686 (2018).
(Continued)

*Primary Examiner* — Stephen W Jackson
(74) *Attorney, Agent, or Firm* — DiBerardino McGovern IP Group LLC

(57) ABSTRACT

A network protector includes: a resettable switching apparatus configured to control an electrical connection between a first distribution transformer and a first electrical feeder of a secondary electrical distribution network; a sensor apparatus configured to sense one or more properties of electrical power in the first electrical feeder; and a controller configured to: analyze one or more of the sensed properties of the electrical power in the first electrical feeder to determine whether an error condition exists in the secondary electrical distribution network; and open the resettable switching apparatus if an error condition exists.

21 Claims, 6 Drawing Sheets

(56) References Cited

U.S. PATENT DOCUMENTS

| | | | |
|---|---|---|---|
| 6,504,693 B1 | 1/2003 | Moffat et al. | |
| 6,671,151 B2 | 12/2003 | Smith et al. | |
| 6,816,757 B1 | 11/2004 | De La Ree et al. | |
| 10,096,991 B2 | 10/2018 | Smith et al. | |
| 11,705,713 B1 * | 7/2023 | Smith | H02H 7/28 |
| | | | 361/62 |
| 2004/0130835 A1 * | 7/2004 | Wahlroos | H01H 9/56 |
| | | | 361/2 |
| 2006/0165023 A1 | 7/2006 | Faulkner et al. | |
| 2007/0086133 A1 | 4/2007 | Loucks et al. | |
| 2015/0124358 A1 | 5/2015 | Hulse | |
| 2017/0133849 A1 | 5/2017 | Feng et al. | |
| 2017/0331274 A1 | 11/2017 | Akke | |
| 2017/0358919 A1 | 12/2017 | Smith et al. | |
| 2019/0027924 A1 * | 1/2019 | O'Regan | H02H 7/26 |
| 2020/0044436 A1 | 2/2020 | Alibert et al. | |
| 2020/0259320 A1 * | 8/2020 | Guo | H02H 3/042 |

FOREIGN PATENT DOCUMENTS

| | | |
|---|---|---|
| JP | 4519337 B2 | 5/2010 |
| JP | 2014017947 A | 1/2014 |
| JP | 2014023303 A | 2/2014 |

OTHER PUBLICATIONS

N. Vineeth et al. "High Impedance Fault detection in Low Voltage Distribution Systems Using Wavelet and Harmonic Fault Indices" 2020 IEEE International Conference on Power Electronics. Smart Grid and Renewable Energy (PESGRE2020). Cochin, India. pp. 1-6. (2020).

Nigel Ramon Jordan. "Integration of network protector relays on downtown distribution networks with penetration of renewable energy." LSU Master's Theses. 2647. 101 total pages. (2014).

P. Mohammadi et al. "Challenges of PV Integration in Low-Voltage Secondary Networks," in IEEE Transactions on Power Delivery. vol. 32, No. 1. pp. 525-535. doi: 10.1109/TPWRD.2016.2556692. (Feb. 2017).

T.E. McDermott et al. "Relaying for Distribution and Microgrids Evolving from Radial to Bidirectional Power Flow." PNNL-29145. 90 total pages. (Sep. 2019).

Temitayo O. Olowu, et al. "Future Challenges and Mitigation Methods for High Photovoltaic Penetration: a Survey." Energies. 1782. doi:10.3390/en11071782. 32 total pages. (2018).

Wanyu Cao et al. "Operating principle of Soft Open Points for electrical distribution network operation" Applied Energy. vol. 164. ISSN 0306-2619. Accessible at: https://www.sciencedirect.com/science/article/pii/S0306261915015718. pp 245-257. (2016).

* cited by examiner

FIG. 7A
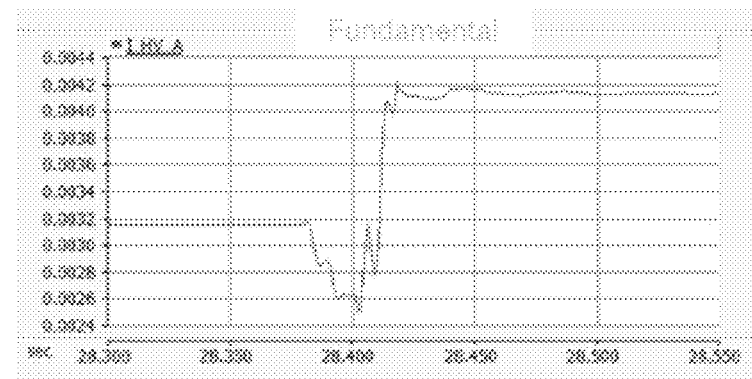
FIG. 7B
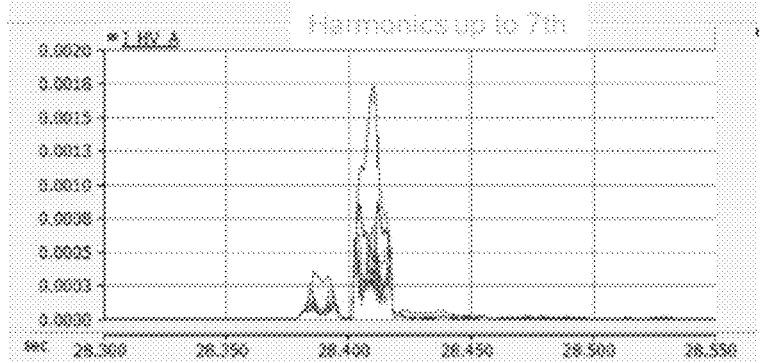
FIG. 8A
FIG. 8B
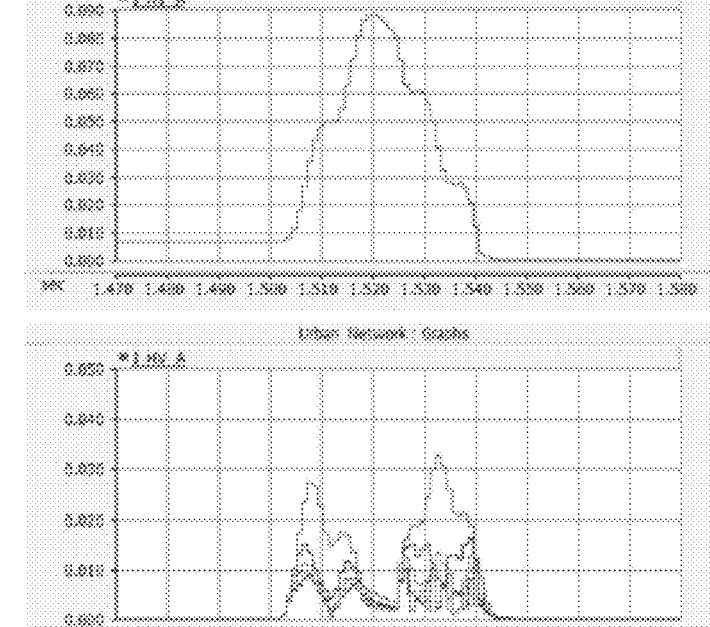

NETWORK PROTECTOR THAT DETECTS AN ERROR CONDITION

CROSS-REFERENCE TO RELATED APPLICATION

This application claims the benefit of U.S. Provisional Application No. 63/272,941, filed on Oct. 28, 2021 and titled NETWORK PROTECTOR THAT DETECTS AN ERROR CONDITION, which is incorporated herein by reference in its entirety.

TECHNICAL FIELD

This disclosure relates to a network protector that detects an error condition.

BACKGROUND

A network protector includes a resettable switching apparatus and may be electrically connected to a feeder in a distribution system to control an electrical connection between a load and the feeder.

SUMMARY

In one aspect, a network protector includes: a resettable switching apparatus configured to control an electrical connection between a first distribution transformer and a first electrical feeder of a secondary electrical distribution network; a sensor apparatus configured to sense one or more properties of electrical power in the first electrical feeder; and a controller configured to: analyze one or more of the sensed properties of the electrical power in the first electrical feeder to determine whether an error condition exists in the secondary electrical distribution network; and open the resettable switching apparatus if an error condition exists.

Implementations may include one or more of the following features.

The error condition may be one or more of a fault condition or a maintenance condition.

The one or more sensed properties may include one or more properties of electrical current that flows in the first electrical feeder. The one or more properties of the electrical current may include a magnitude of one or more frequency harmonics of the electrical current, and the controller may be configured to determine that the reverse power flow is from an error condition if the magnitude of one or more frequency harmonics exceeds a threshold value. The electrical current includes reverse current flow generated by a distributed energy resource, and the controller may be configured to open the resettable switching apparatus only if the one or more properties of the reverse current indicate that the error condition exists. The one or more properties of the electrical current may include a characteristic of a transient of the electrical current.

The controller also may be configured to determine whether reverse power flow exists in the first electrical feeder, and the controller may be configured to analyze the one or more sensed properties only if reverse power flow exists in the first electrical feeder.

The first electrical feeder may be configured to be electrically connected to one or more distributed energy resources.

The first electrical feeder may be configured to be electrically connected to an energy source that is also electrically connected to a second electrical feeder of the secondary electrical distribution network, and the first electrical feeder and the second electrical feeder may be electrically connected to the same load.

In another aspect, a system includes: a first network protector configured to control an electrical connection between a first distribution transformer and a first electrical feeder of a secondary distribution network, the first network protector including: a first resettable switching apparatus; a first sensor apparatus configured to sense one or more properties of electrical power in the first electrical feeder; and a first controller configured to analyze one or more of the sensed properties of the electrical power in the first electrical feeder to determine whether an error condition exists in the first electrical feeder. The system also includes a second network protector configured to control an electrical connection between a second distribution transformer and a second electrical feeder of the secondary distribution network, the second network protector including: a second resettable switching apparatus; a second sensor apparatus configured to sense one or more properties of electrical power in the second electrical feeder; and a second controller configured to analyze one or more of the sensed properties of the electrical power in the first electrical feeder to determine whether an error condition exists in the second electrical feeder.

Implementations may include one or more of the following features.

The error condition may include one or more of a fault condition or a maintenance condition.

The one or more sensed properties may include one or more properties of electrical current that flows in the first electrical feeder. The one or more sensed properties of the electrical power in the first electrical feeder may include a frequency characteristic of the electrical current in the first electrical feeder, and the one or more sensed properties of the electrical power in the second electrical feeder may include a frequency characteristic of the electrical current in the second electrical feeder. The frequency characteristic of the electrical current in the first electrical feeder may include an amplitude of one or more harmonic components of the electrical current in the first electrical feeder, and the frequency characteristic of the electrical current in the second electrical feeder may include an amplitude of one or more harmonic components of the electrical current in the second electrical feeder.

The system also may include: a first circuit breaker configured to control an electrical connection between the first distribution transformer and an AC power source, and a second circuit breaker configured to control an electrical connection between the second distribution transformer and the same AC power source.

The system also may include: a first circuit breaker configured to control an electrical connection between the first distribution transformer and a first AC power source, and a second circuit breaker configured to control an electrical connection between a second AC power source that is distinct from the first AC source.

In another aspect, a method includes: accessing, at a network protector, one or more values related to one or more properties of electrical power in an electrical feeder of a secondary electrical distribution network; analyzing at least one value to determine whether an error condition exists in the secondary electrical distribution network; and if an error condition exists, opening a resettable switching apparatus in the network protector to disconnect the electrical feeder from a distribution transformer.

Implementations may include one or more of the following features.

A plurality of values may be accessed, each of the plurality of values being an amplitude of a harmonic component of current flowing in the secondary electrical distribution network, and the method also may include: comparing the amplitude of each harmonic component to a corresponding threshold value for that harmonic component. An error condition may exist when one or more of the amplitudes exceeds the corresponding threshold value.

A plurality of values may be accessed, each of the plurality of values being an amplitude of a harmonic component of current flowing in the secondary electrical distribution network, and the method also may include: comparing the amplitude of each harmonic component to a corresponding prior value for that harmonic component. An error condition may exist when a difference between one or more of the amplitudes exceeds a threshold value.

The method also may include: determining whether reverse current flow exists in the electrical feeder based on the one or more values; and, in some implementations, the at least one value is analyzed to determine whether an error condition exists in the secondary electrical distribution network only if reverse current flow exists in the electrical feeder.

Implementations of any of the techniques described herein may include a system, a network protector, a controller, a method, a process, or executable instructions stored on a machine-readable medium. The details of one or more implementations are set forth in the accompanying drawings and the description below. Other features will be apparent from the description and drawings, and from the claims.

DRAWING DESCRIPTION

FIGS. 7A and 7B are examples of simulated data of current flow in a secondary network when there is no fault condition.

FIGS. 8A and 8B are examples of simulated data of current flow in a secondary network when there is a fault condition.

DETAILED DESCRIPTION

Figure 1A:
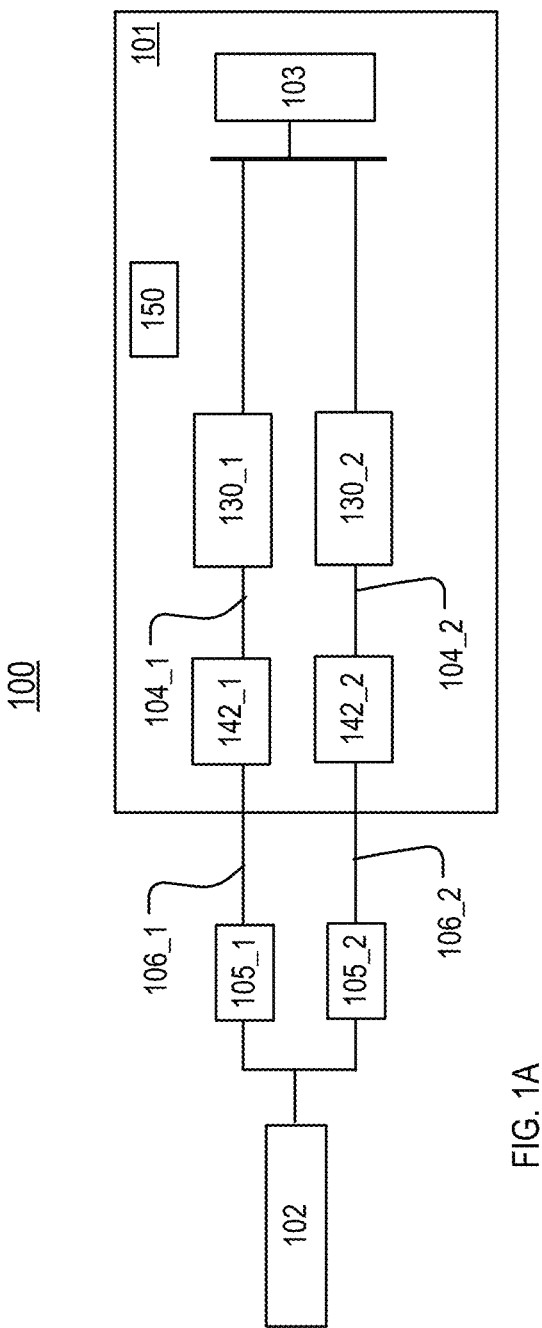
FIG. 1A is a block diagram of an example of an electrical power system.

FIG. 1A is a block diagram of an example of an electrical power system 100. The power system 100 may be a single-phase power system or a multi-phase (for example, three-phase) power system. A single phase is shown in FIG. 1A for simplicity. The electrical power system 100 includes a secondary electrical power distribution network 101 that includes network protectors 130_1 and 130_2 coupled to respective feeders 104_1 and 104_2. The secondary electrical power distribution network 101 is electrically connected to an alternating current (AC) source 102 and to a load or loads 103. The network protectors 130_1 and 130_2 control the electrical connection between the respective feeder 104_1 and 104_2 and loads 103.

The system 100 also includes a controller 150. As discussed in more detail below, the controller 150 analyzes one or more properties of the power that flows on the feeders 104_1 and 104_2 to determine whether an error condition exists. The configuration of the controller 150 allows the network protectors 130_1 and 130_2 to accept bi-directional power flow (power flow away from or toward the source 102) while also allowing the network protectors 130_1 and 130_2 to protect the load 103 from abnormal conditions or error conditions.

In the discussion below, reverse power flow is power that flows toward the source 102 and forward power flow is power that flows away from the source 102. Bi-directional power flow includes reverse power flow and forward power flow. Forward power flow is typically present during normal and expected operation of the system 100. Reverse power flow may arise from error conditions. However, reverse power flow also may arise from excess power that is generated by a distributed energy resource (DER) and/or from circulating current that may arise when the source 102 is implemented as more than one independent AC power source. Although reverse power flow from error conditions is undesirable, reverse power flow that arises from DER power generation is generally desirable and may be used by other systems within the power system 100. Moreover, reverse power flow that arises from a circulating current caused by a differences in the phase of voltage generated by independent AC power sources is not necessarily undesirable.

Traditional network protectors are configured with logic that assumes that reverse power flow is an indication of a fault condition, and these traditional network protectors open and disconnect their load based on a detection of reverse power flow. Thus, such traditional network protectors are unable to return excess power generated by a DER to the grid and are also unable to be used in a secondary network that is fed by more than one independent AC power source.

On the other hand, the controller 150 is configured to analyze properties and characteristics of the power that flows in the feeders 104_1 and/or 104_2 in order to determine whether an error condition exists. The properties and characteristics analyzed by the controller 150 include, for example, harmonic content of the current and/or voltage, overshoot characteristics, and/or transient characteristics. The controller 150 does not assume that reverse power flow is caused by an error condition. Instead, the controller 150 is configured to allow reverse power flow so long as no error condition exists. The error condition may be, for example, a maintenance condition or a fault condition. A maintenance condition is a condition that is intentionally caused due to scheduled maintenance or other intentional maintenance that halts or changes the flow of power in the secondary distribution network 101. A fault condition is an unintentional event that halts or changes the flow of power in the secondary distribution network 101. Examples of unintentional events include, for example, a phase-to-ground fault, an overcurrent condition caused by a short, or an over-voltage condition. Unintentional events may be caused by falling objects, ingress of moisture, storms, equipment malfunction, and other unplanned events.

The controller 150 and the network protectors 130_1 and 130_2 have fewer tripping (or opening events) than a traditionally configured network protector and, as a result, may have a longer lifetime and may cause fewer service interruptions than a traditionally configured network protector. Additionally, the controller 150 and the network protectors 130_1 and 130_2 encourage efficient use of generated energy and may be used in a secondary distribution network that is fed by more than one AC source.

Before discussing the controller 150 in greater detail, an overview of the system 100 and its various components is provided.

Figure 1B:
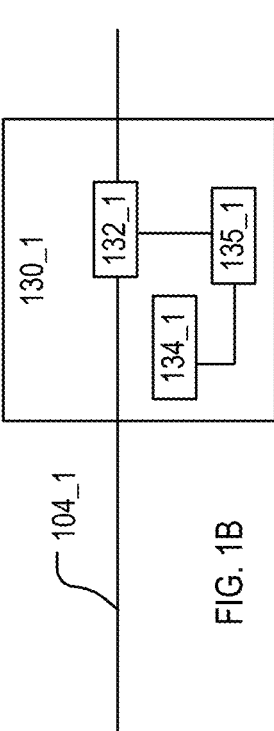
FIG. 1B is a block diagram of an example of a network protector that may be used in the power system of FIG. 1A.

Referring also to FIG. 1B, the network protector 130_1 includes a resettable switching apparatus 132_1, a sensor apparatus 134_1, and a switch control mechanism 135_1. The sensor apparatus 134_1 monitors the electrical power on the feeder 104_1 and the switch control mechanism 135_1 operates the resettable switching apparatus 132_1. The switch control mechanism 135_1 may be, for example, a relay. The switch control mechanism 135_1 may be coupled to the controller 150 or implemented as part of the controller 150.

The resettable switching apparatus 132_1 is any type of switch that is capable of opening and closing the feeder 104_1. For example, the resettable switching apparatus 132_1 may be an air circuit breaker. An air circuit breaker includes two electrical contacts that operate in air at atmospheric pressure. When the electrical contacts are joined, current can flow in the feeder 104_1. When the electrical contacts are separated, current cannot flow in the feeder 104_1. The resettable switching apparatus 132_1 is configured for repeated operation. For example, after the resettable switching apparatus 132_1 opens the feeder 104_1 to stop or prevent current flow, the resettable switching apparatus 132_1 is able to close the feeder 104_1 such that current flow in the feeder 104_2 resumes. The resettable switching apparatus 132_1 also may include additional components and systems such as actuators, motors, springs, levers, and/or driving electronics that facilitate the operation of the switching apparatus 132_1.

The network protector 130_2 is configured in a similar manner. Moreover, other implementations are possible. For example, although only one instance of the controller 150 is shown in FIGS. 1A and 1B, in some implementations each network protector 130_1 and 130_2 includes a separate instance of the controller 150.

Figure 5:
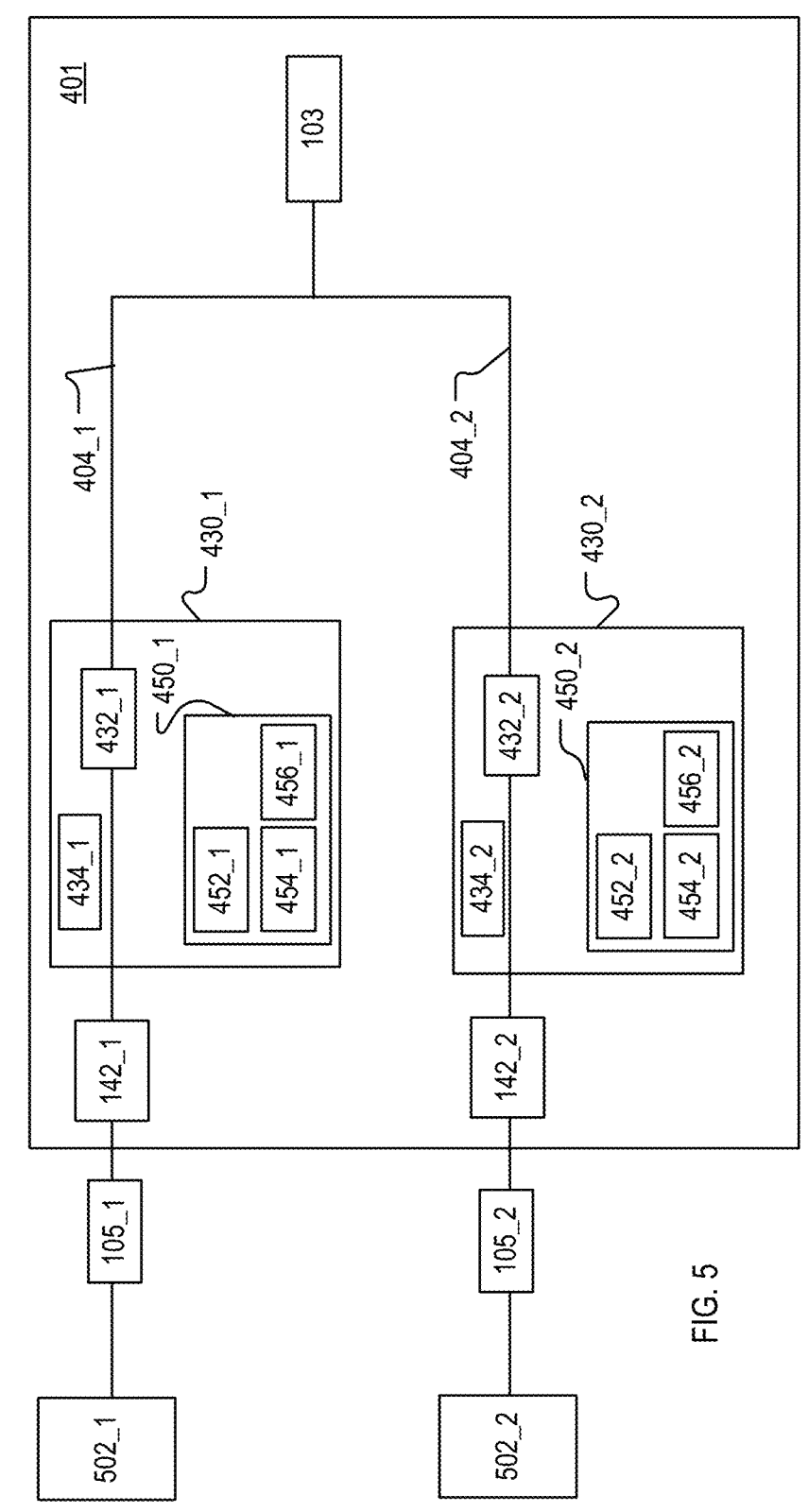
FIG. 5 is a block diagram of an example of a secondary network that is fed by two independent (AC) sources.

The AC power source 102 operates at a fundamental frequency of, for example, 50 or 60 Hertz (Hz). The power source 102 may be a generator, a power plant, an electrical substation, or a renewable energy source. The power source 102 may be medium-voltage or distribution voltage (for example, between 1 kilovolts (kV) and 35 kV) or high-voltage (for example, 35 kV and greater). Moreover, the power source 102 may receive power from other electrical power sources that are not shown in FIG. 1A. For example, the power source 102 may be a medium-voltage substation that receives and transforms high-voltage AC power into medium-voltage AC power that is provided to feeders 106_1 and 106_2. The power source 102 is connected to the feeder 106_1 through a medium-voltage circuit breaker 105_1 and to the feeder 106_2 through a medium-voltage circuit breaker 105_2. The medium-voltage circuit breakers 105_1 and 105_2 operate in the event of a fault to disconnect the source 102 from the system 100. The medium-voltage circuit breakers 105_1 and 105_2 also may be opened intentionally and in a planned manner to perform maintenance on the system 100. In some implementations, multiple independent AC power sources feed the secondary distribution network 101. An example of such an implementation is shown in FIG. 5.

The feeders 106_1 and 106_2 transfer AC electrical power from the power source 102 to a primary or source side of respective distribution transformers 142_1 and 142_2. A distribution transformer is a transformer performs a voltage transformation at an end point or node of a distribution grid. In the example of FIG. 1A, the distribution transformers 142_1 and 142_2 convert the voltage on the respective feeders 106_1 and 106_2 (which is determined by the source 102) to lower voltages that are suitable for general household, industrial, and/or commercial use. For example, the distribution transformers 142_1 and 142_2 may transform the voltage on the respective feeders 106_1 and 106_2 to a voltage of 1 kV or less. The secondary side of each distribution transformer 142_1, 142_2 is connected to a respective feeder 104_1, 104_2 of the secondary distribution network 101.

The loads 103 may include one or more distributed energy resources (DER). A DER is an electricity-producing resource and/or a controllable load. Examples of DER include, for example, solar-based energy sources such as, for example, solar panels and solar arrays; wind-based energy sources, such as, for example wind turbines and windmills; combined heat and power plants; rechargeable sources (such as batteries); natural gas-fueled generators; electric vehicles; and controllable loads, such as, for example, some heating, ventilation, air conditioning (HVAC) systems, and electric water heaters. The loads 103 also may include devices and systems that are not DERs. For example, the loads 103 also may include motors, lighting systems, and/or machines.

Under some conditions, the power generated by the DERs exceeds the power demand of the loads 103, and the DERs return electrical power to the secondary distribution system 101. This returned electrical power is reverse power that flows from the loads 103 toward the source 102. As noted above, network protectors that are configured in the traditional manner open based on detection of power flowing from the load to the source, even if the reverse flow does not arise from an abnormal operating condition. On the other hand, in the system 100, the controller 150 is configured to determine whether or not the distribution network 101 is in an abnormal condition by analyzing one or more sensed properties or characteristics of the power that flows in the secondary distribution network 101. Thus, the network protectors 130_1 and 130_2 are configured to provide the excess energy generated by the DERs to the system 100. Moreover, the network protectors 130_1 and 130_2 and the control 150 may be used in implementations in which the secondary distribution network 101 has a relatively high penetration of DER power generation, for example, a 90% or greater penetration. DER penetration is the ratio of nominal capacity of DER power generation to the nominal load of the feeder to which the DERs are connected. The likelihood of reverse power arising from DER power generation occurring increases with DER penetration.

The secondary electrical power distribution network 101 is a low-voltage network (for example, a network that distributes electricity having a voltage of 1 kV or less). The secondary electrical power distribution network 101 may be a spot network or an area network. In a spot network, two or more feeders are connected in parallel to a common bus to provide power to a specific location or spot. A grid or area network includes redundant feeders. Regardless of the configuration of the low-voltage network, the network protectors 130_1 and 130_2 improve the overall performance of the low-voltage network. For example, reverse power caused by DER generation exceeding the demand causes in a network protector with a traditional configuration to open, even if there is no fault condition. In a spot network that employs traditional network protectors, any reverse power causes the network protectors to open, which results in a service outage for the load. In an area or grid network that employs only traditional network protectors, the presence of reverse power may cause fewer than all network protectors to open, however, reliability is reduced when even some of the network protectors open. Thus, the network protectors 130_1 and 130_2, which do not assume that reverse power flow is caused by a fault condition, improve the performance of spot and area networks.

Figures 2, 3:
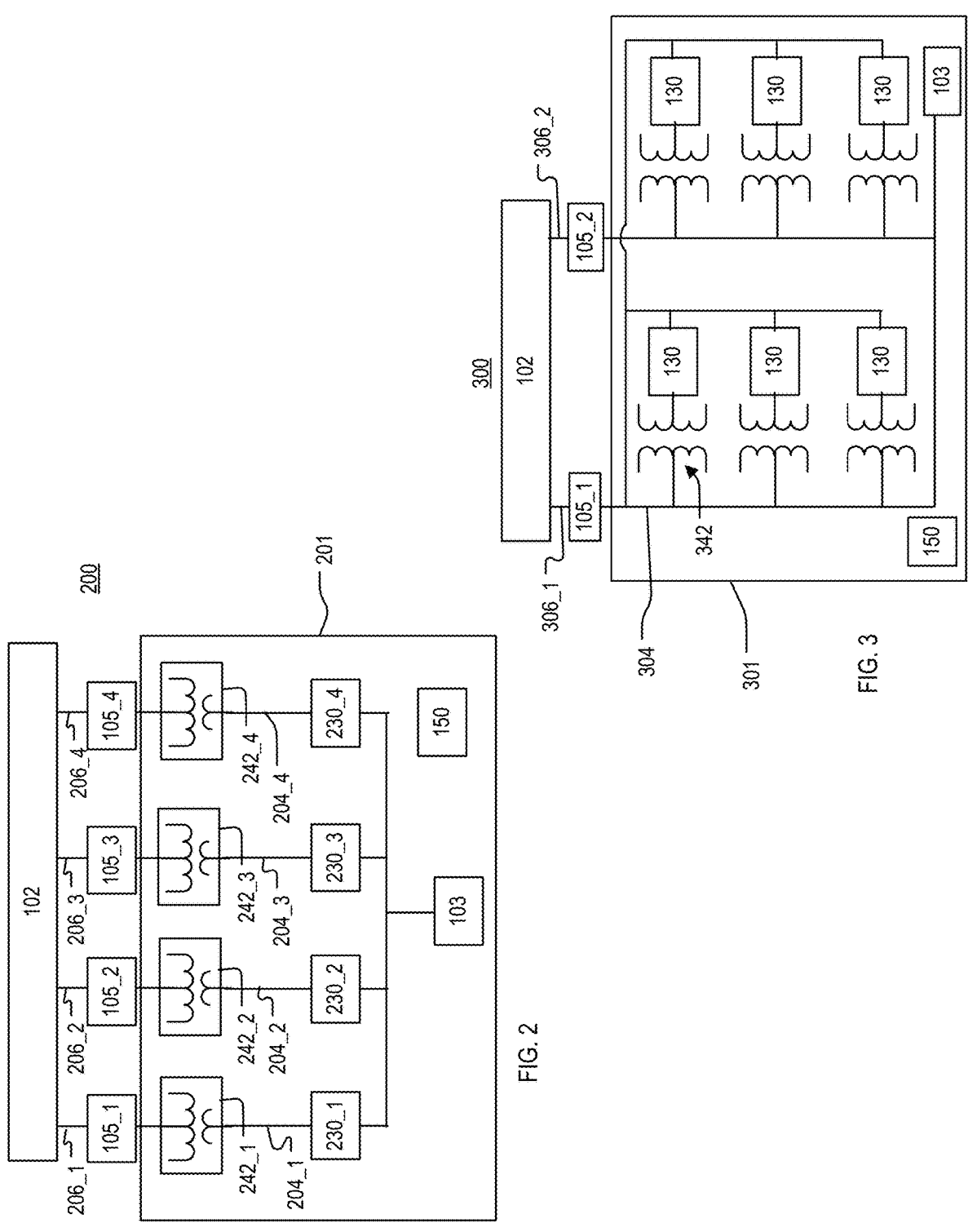
FIG. 2 is a block diagram of an example of a spot network.
FIG. 3 is a block diagram of an example of an area network.

FIG. 2 is a block diagram of an electrical power system 200 that includes a spot network 201. The spot network 201 includes four parallel low-voltage feeders 204_1, 204_2, 204_3, 204_4 that are all connected to a spot, which is the loads 103 in the example of FIG. 2. The loads 103 may be, for example, a variety of electrical loads that are all within one large building or location, such as an airport terminal, a hospital, or an apartment building. The spot network 201 includes one or more DERs. The loads 103 include one or more DERs.

The spot network 201 receives electrical power from four medium-voltage feeders 206_1, 206_2, 206_3, 206_4 that are fed by the AC power source 102. The feeders 206_1, 206_2, 206_3, 206_4 include respective circuit breakers 105_1, 105_2, 105_3, and 105_4 that open in the presence of an abnormal condition, such as a fault (for example, an over-voltage or over-current condition) or scheduled maintenance.

Each medium-voltage feeder 206_1, 206_2, 203_3, 206_4 is electrically connected to a primary side of a respective distribution transformer 242_1, 242_3, 242_3, 242_4. The voltage at on each feeder 206_1, 206_2, 206_3, 206_4 and at the primary side of each respective distribution transformer 242_1, 242_3, 242_3, 242_4 is determined by the voltage of the source 102. The distribution transformers 242_1, 242_3, 242_3, 242_4 step down (reduce) the voltage from the source 102 such that the voltage at a secondary side of each transformer is lower than the voltage at the primary side. The voltage at the primary side of the distribution transformers may be, for example, between 1 kV and 35 kV, and the voltage at the secondary side of the distribution transformers may be, for example, 240 V, 480 V, 600 V, or another voltage below 1 kV.

The secondary side of each distribution transformer 242_1, 242_3, 242_3, 242_4 is electrically connected to a respective low-voltage feeder 204_1, 204_2, 204_3, 204_4. Respective switch devices 230_1, 230_2, 230_3, 230_4 control the electrical connection between the loads 103 and each low-voltage feeder 204_1, 204_2, 204_3, 204_4. The operation of the switch devices 230_1, 230_2, 230_3, 230_4 is controlled by the controller 150. Although the controller 150 is shown as a single element, in some implementations, each switch device 230_1, 230_2, 230_3, 230_4 has a dedicated local controller that controls the operations of that switch device. In these implementations, the spot network 201 includes four instances of the controller 150, and each instance of the controller is associated with one switch device. Each switch device 230_1, 230_2, 230_3, 230_4 may be, for example, a network protector. In implementations in which the switch devices 230_1, 230_2, 230_3, 230_4 are network protectors, each network protector may have a dedicated local controller.

FIG. 3 is a block diagram of a power system 300 that includes an area network 301. The area network 301 includes redundant feeders 304 (only one of which is labeled), network protectors 130, and transformers 342 that provide power to the loads 103. The area network 301 may include tens of redundant feeders 304 and network protectors 130, and the loads 103 may include tens, hundreds, or thousands of loads. The network protectors 130 are controlled by the controller 150. Although the controller 150 is shown as a single element, in some implementations, each switch device 130 has a dedicated local controller.

FIGS. 1A, 2, and 3 are provided as examples, and the controller 150 may be used with distribution networks having other configurations. For example, although one AC power source 102 is shown in FIGS. 2 and 3, the spot network 201 and the area network 301 may be fed by more than one independent AC power source. In another example, the distribution network 201 may have fewer or more than four parallel low-voltage feeders. Moreover, the examples discussed above relate to network protectors. However, other resettable switching apparatuses, for example, reclosers and/or switchgear, may be used in the secondary distribution network 101 and may be implemented with the controller 150.

Figure 4:
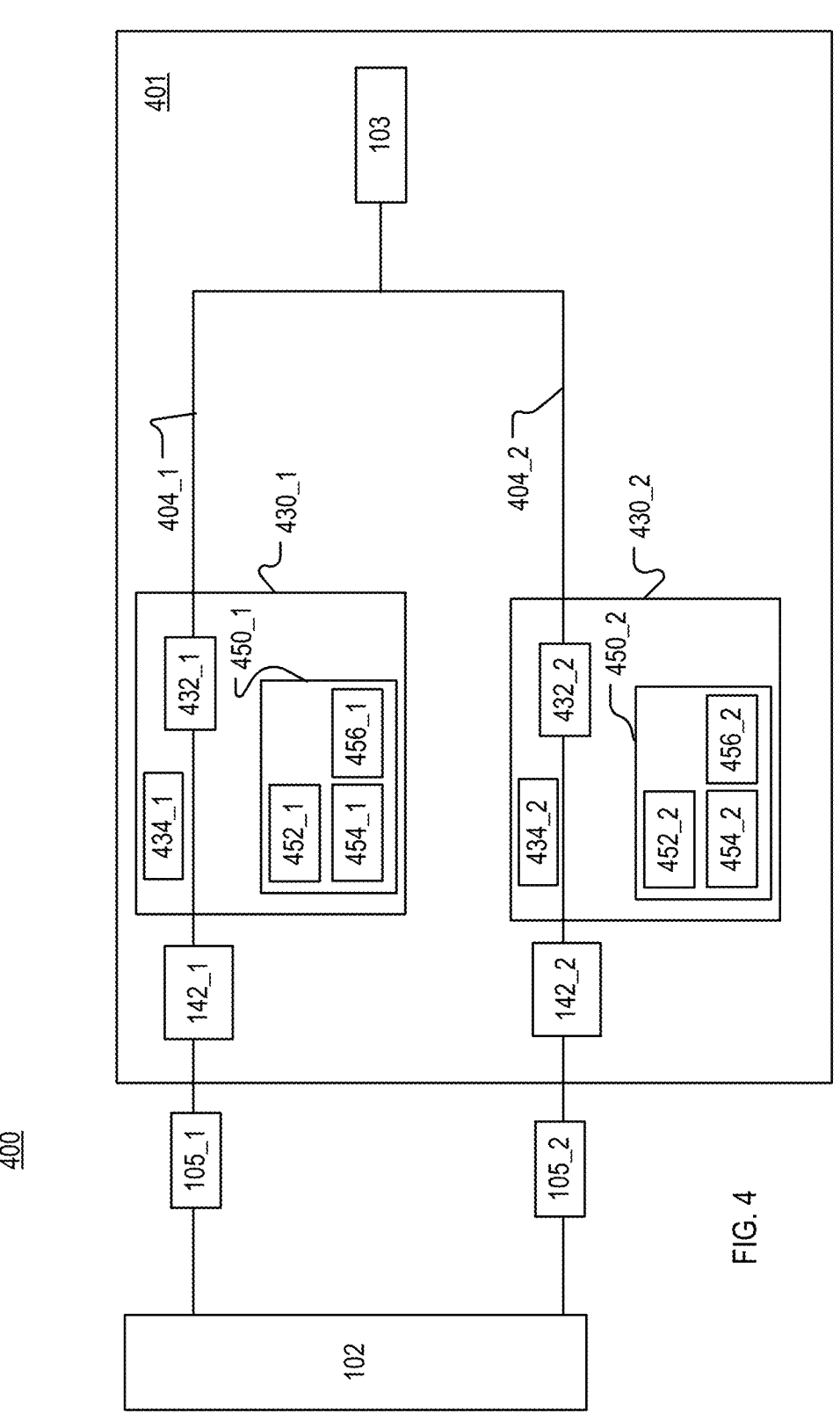
FIG. 4 is a block diagram of an example of a secondary network that is fed by a single alternating current (AC) source.

FIG. 4 is a block diagram of a system 400 that includes a secondary distribution network 401. The distribution network 401 is a low-voltage secondary distribution network and includes a plurality of feeders. In the example of FIG. 4, two feeders 404_1 and 404_2 are shown. A network protector 430_1 is coupled to the feeder 404_1 and a network protector 430_2 is coupled to the feeder 404_2. A single phase is shown in FIG. 4. However, the network protectors 430_1 and 430_2 may be multi-phase (for example, three-phase) network protectors.

The network protector 430_1 includes a resettable switching apparatus 432_1, a sensing apparatus 434_1, and a controller 450_1. In the example of FIG. 4, the controller 450_1 is part of the network protector 430_1. For example, the controller 450_1 and the resettable switching apparatus 432_1 may be contained together in the same housing. In some implementations, the controller 450_1 is separate from the network protector 430_1 but is in communication with the resettable switching apparatus 432_1 and the sensor apparatus 434_1.

The network protector 430_1 also includes a sensor apparatus 434_1. The sensor apparatus 434_1 includes one or more detectors or sensors, each of which is configured to sense one or more properties of the power that flows in the feeder 404_1. The sensor apparatus 434_1 may include any type of current sensor, such as, for example, a current transformer (CT) or a Rogowski coil. In some implementations, a conductor-mounted power flow sensor with a high sampling rate, such as the GridAdvisor Series II smart sensor, available from the Eaton Corporation of Cleveland, Ohio, may be used. Alternately or additionally, the sensor apparatus 434_1 may include one or more voltage sensors and/or one or more power sensors. The sensor apparatus 434_1 may include other related devices, such as timers or other devices that measure the passage of time, and/or a spectrum analyzer or other device configured to measure the frequency content of the power that flows in the secondary network 401.

The sensor apparatus 434_1 produces data related to the properties and/or characteristics of the power that flows on the feeder 404_1. The data may be frequency domain data produced by a device such as a spectrum analyzer. For example, the sensor apparatus 434_1 may produce values or other indicators of the amplitude of one or more frequency harmonics of the electrical current that flows on the feeder 404_1. The amplitude may be expressed as an absolute value in amperes (A) or as a percentage of the amplitude of the fundamental current harmonic. In some implementations, the data from the sensor apparatus 434_1 is time domain data.

For example, the data from the sensor apparatus 434_1 may be time-domain data, such as a collection of current amplitude values, power values, and/or voltage values that are each associated with a time stamp. In some implementations, the sensor apparatus 434_1 produces an indication of a transient and/or an overshoot of the electrical current that flows on the feeder 404_1 and/or the voltage on the feeder 401_1. A transient is a relatively short-lived burst of current or voltage that has a greater than typical amplitude. The indication of the transient may be a time duration during which the current on the feeder 404_1 is above a threshold value or the rise time of the transient. The rise time of the transient may be the time that the current and/or voltage increases from the typical or expected amplitude to a threshold amount or to the maximum amplitude. Another example of time-domain data that the sensor apparatus 434_1 may produce is an indication of an overshoot of the current on the feeder 404_1. The overshoot is the difference between the expected current amplitude and a measured current. In some implementations, the sensor apparatus 434_1 produces time-domain data and frequency-domain data.

The sensor apparatus 434_1 may produce additional data about the power that flows in the feeder 404_1. For example, the sensor apparatus 434_1 may be configured to produce an indication of the direction of current flow on the feeder 404_1. In these implementations, the sensor apparatus 434_1 may include a directional device, such as a diode, that is capable of providing an indication of the direction of current flow on the feeder 404_1. In these implementations, the sensor apparatus 434_1 produces an indication of the direction of current flow. For example, the sensor apparatus 434_1 may produce a binary indicator that has a first value when current flows toward the loads 103 and second value when current flows toward the source 102.

The network protector 430_1 also includes the controller 450_1. The controller 450_1 analyzes data from the sensor apparatus 434_1 to determine whether or not an error condition exists in the secondary network 401. If an error condition exists in the secondary network 401, the controller 450_1 causes the resettable switching apparatus 432_1 to open.

The controller 450_1 is an electronic controller that includes an electronic processing module 452_1, an electronic storage 454_1, and an input/output (I/O) interface 456_1. The electronic processing module 452_1 includes one or more electronic processors, each of which may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 454_1 may be any type of electronic memory that is capable of storing data and instructions in the form of computer programs or software, and the electronic storage 454_1 may include volatile and/or non-volatile components. The electronic storage 454_1 and the processing module 452_1 are coupled such that the processing module 452_1 can access or read data from and write data to the electronic storage 454_1.

The electronic storage 454_1 stores executable instructions, for example, as a computer program, logic, or software, that cause the processing module 452_1 to perform various operations. For example, the electronic storage 454_1 stores executable instructions that cause the processing module 452_1 to perform the process 600 of FIG. 6. To provide another example, the electronic storage may store instructions that cause readings from the sensor apparatus 434_1 to be stored on the electronic storage 454_1. The instructions also may include instructions that compare the readings obtained by the sensor apparatus 434_1 to one or more threshold values or specifications stored on the electronic storage 454_1.

The electronic storage 454_1 also may store information about the network protector 430_1 and/or the feeder 404_1, such as one or more threshold values and/or a specification used for determining whether a change has occurred in one or more measured properties. For example, the electronic storage 454_1 may store instructions that determine whether the amplitude of one or more current harmonics exceeds a respective threshold. Additionally, the electronic storage 454_1 may store instructions that implement various mathematical approaches, such as instructions that implement a Wavelet transform.

Furthermore, the electronic storage 454_1 may store instructions that, when executed, cause the electronic processing module 452_1 to generate a command signal that causes the resettable switching mechanism 432_1 to change state. For example, the electronic processing module 452_1 send a switch control mechanism (such as the relay 135_1 shown in FIG. 1B) a command signal that causes the resettable switching mechanism 432_1 to open or close, or the electronic processing module 452_1 may send a command signal directly to the resettable switching mechanism 432_1. Moreover, the electronic storage 454_1 may store information related to the conditions under which the network protector 430_1 is to be opened or closed. For example, the electronic storage 454_1 may store a threshold value that represents a maximum acceptable difference between network-side and source-side voltage vectors to allow the network protector 430_1 to transition from the open state to the closed state.

Furthermore, the electronic storage 454_1 may include instructions that implement techniques for filtering and/or preparing the data produced by the sensor apparatus 434_1. For example, the electronic storage 454_1 may include instructions that implement an analog-to-digital (A/D) converter that digitizes analog data from the sensor apparatus 434_1. In another example, the instructions may include instructions that convert time-domain data from the sensor 434_1 into frequency-domain data and vice versa.

The I/O interface 456_1 may be any interface that allows a human operator and/or an autonomous process to interact with the controller 450_1. The I/O interface 456_1 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 456_1 also may allow communication without physical contact through, for example, an IEEE 802.11, Bluetooth, or a near-field communication (NFC) connection. The controller 450_1 may be, for example, operated, configured, modified, or updated through the I/O interface 456_1.

The I/O interface 456_1 also may allow the controller 450_1 to communicate with systems external to and remote from the network protector 430_1. For example, the I/O interface 456_1 may include a communications interface that allows communication between the controller 450_1 and a remote station (not shown), or between the controller 450_1 and a separate electrical apparatus in the power system 100 (FIG. 1A) using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the controller 450_1 without making physical contact with the network protector 430_1 or the controller 450_1. For example, the remote station may be a computer-based work station, a smart phone, tablet, or a laptop computer that connects to the controller 450_1 via a services protocol, or a remote control that connects to the controller 450_1 via a radio-frequency signal. The controller 450_1 may communicate information such as the determined tap position through the I/O interface 456_1 to the remote station or to a separate device in the power system 400.

The network protector 430_2 is configured in the same manner. The network protector 430_2 includes a resettable switching apparatus 432_2, a sensor apparatus 434_2, and a controller 450_2. The network protector 430_2 monitors and controls the power flow in the feeder 404_2.

Other implementations are possible. For example, in FIG. 4, the source 102 is a single AC source that is connected to the secondary distribution network 401. However, the network protectors 430_1 and 430_1 may be used to determine whether an error condition exists in implementations in which the secondary distribution network 401 is fed by multiple independent and distinct AC power sources. FIG. 5 is a block diagram of a system 500 that includes two distinct AC sources: a first AC source 502_1 and a second AC source 502_2. The first AC source 502_1 is connected to the circuit breaker 105_1, and the second AC source 502_2 is connected to the circuit breaker 105_2. The first AC source 105_1 and the second AC source 502_2 are separate and independent AC sources and may produce voltage having different amplitudes and/or phases.

Differences between the amplitude and/or phase of the voltage produced by the AC sources 502_1 and 502_2 may produce a circulating current that flows in the secondary network 401 toward the sources 502_1 and/or 502_2. Thus, the circulating current is a reverse current. However, the circulating current is not necessarily a fault condition and the system 500 may operate as expected in the presence of the circulating current.

As discussed above, a conventional or traditional network protector opens in the presence of a reverse current. However, the controllers 450_1 and 450_2 are configured to analyze the current that flows in the feeders 404_1 and 404_2 to determine whether an error condition exists. Thus, the network protectors 530_1 and 530_2 also reduce unnecessary operation of the network protectors 530_1 and 530_2 and reduce service outages in implementations in which the secondary distribution system 401 is fed by more than one distinct AC power source.

Figure 6:
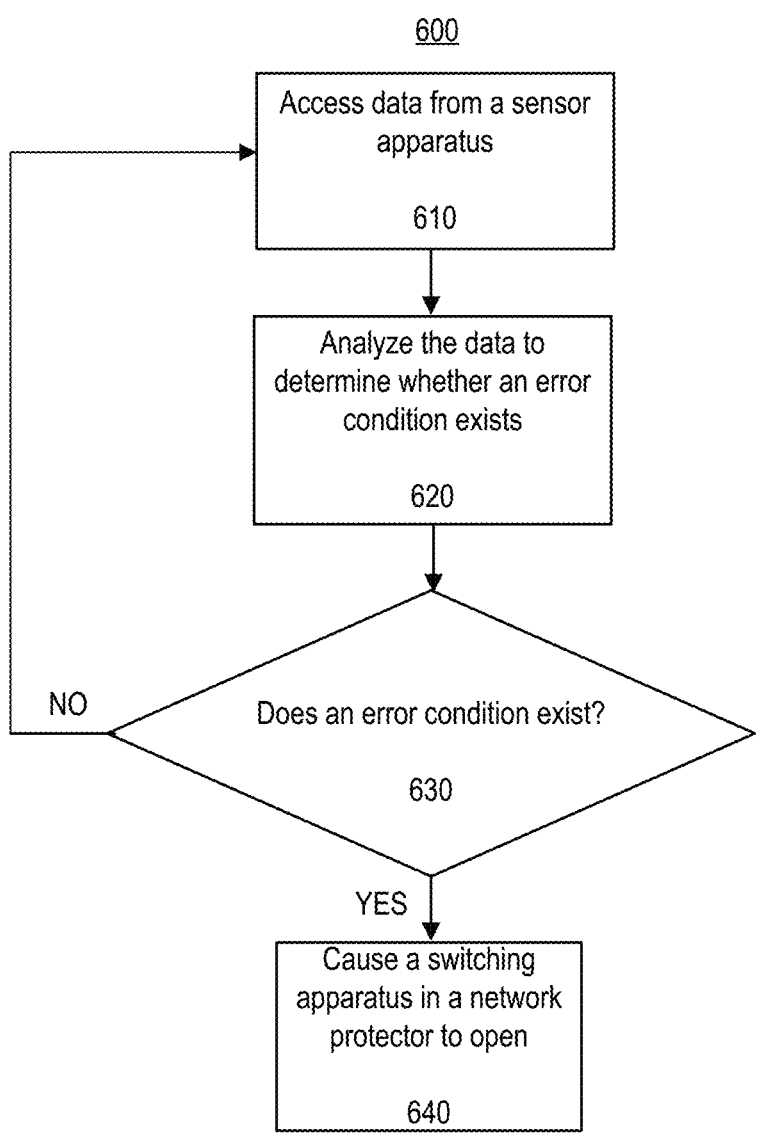
FIG. 6 is a flow chart of an example of a process of operating a network protector to determine whether an error condition exists in a secondary distribution network.

FIG. 6 is a flow chart of a process 600. The process 600 is an example of a process of operating a network protector to determine whether an error condition exists in a secondary distribution network. The process 600 may be performed by the controller 150, the controller 450_1, or the controller 450_2. The process 600 is discussed with respect to the controller 450_1.

Data from the sensor apparatus 434_1 is accessed (610). The data may include frequency domain and/or time domain data. The data from the sensor apparatus 434_1 may be an indication of the current, power, and/or voltage on the feeder 404_1 over time. For example, the data from the sensor apparatus 434_1 may be time-domain data, such as a collection of current amplitude values, power values, and/or voltage values that are each associated with a time stamp. The data may include frequency domain data, such as an amplitude of one or more harmonics of the AC current that flows on the feeder 404_1. The data also may include data that indicates a direction of current flow on the feeder 404_1.

The data from the sensor apparatus 434_1 may be accessed by retrieving the data from the sensor apparatus 434_1. In some implementations, the sensor apparatus 434_1 provides the data to the controller 450_1 continuously or on a regular basis via a communications path.

The data is analyzed to determine whether an error condition exists in the secondary network 401 (620). The existence of an error condition causes the properties and characteristics of the power on the feeder 404_1 to change compared to when there is no error condition. Reverse power generated by DERs and circulating current that arises from the secondary network 401 being fed by more than one independent AC power source have characteristics that are the same as forward current flow that occurs in ordinary and normal conditions, so long as no error condition is present. In other words, the properties of the reverse current flow generated by excess power generated by DERs and the properties of reverse current that is circulating current have the same features and characteristics as normal, non-fault forward current. Thus, by analyzing the properties of the power flow on the feeder 404_1, the controller 450_1 determines whether or not an error condition exists.

For example, a high-impedance fault in the secondary distribution network may be caused by a phase-to-ground fault. Such a fault changes the amplitude of the harmonics of the current that flows on the feeder 404_1. The current that flows on the feeder 404_1 has a fundamental frequency that is determined by the AC source or sources that feed the secondary distribution network 401. The fundamental frequency may be, for example, 60 Hz. The current also includes components that have frequencies that are integer multiples of the fundamental frequency. For example, if the fundamental frequency is 60 Hz, the AC current on the feeder 404_1 also may include components at 180 Hz (the third harmonic in this example). Each component or current harmonic has a corresponding amplitude that is expressed in amperes. Under ordinary conditions when there is no error condition, the component at the fundamental frequency has the largest amplitude and the amplitude of each of the other harmonics is much smaller. In the presence of a high-impedance fault, the amplitude of one or more odd-numbered harmonics (for example, the $3^{rd}$, $5^{th}$, $7^{th}$, $13^{th}$, $15^{th}$, and/or $17^{th}$ harmonics) increases substantially and the current also may include even-numbered components.

In some implementations, the data from the sensor apparatus 434_1 includes information about the current harmonics, and this data is analyzed to determine whether or not an error condition exists. For example, the magnitude of one or more harmonics may be compared to a threshold value that represents the magnitude of that harmonic under ordinary conditions. In another example, the measured amplitude of a harmonic is compared to the amplitude of that same harmonic measured at an earlier time when no error condition existed. In another example, a shape or profile of the amplitude of the current and/or voltage harmonics over time are analyzed.

In some implementations, a Wavelet transform is used to provide additional information about the harmonics. The Wavelet transform is a signal processing technique that decomposes the data from the sensor apparatus 434_1 into different ranges of frequencies using a series of low-pass and high-pass filters. The Wavelet transform provides a time-frequency multi-resolution analysis, the results of which provide an indication of short-lived, sudden, and/or abrupt variations in the electrical parameters represented in the data from the sensor apparatus 434_1. For example, the Wavelet transform may provide indications of short-lived, sudden, and/or abrupt variations in voltage, phase, current, and/or frequency of the power flow on the feeder 404_1. The Wavelet transform helps to detect and/or identify variation in harmonics of current and/or voltage, and these variations indicate whether or not a fault condition is present.

Faults and planned opening of the circuit breaker 105_1 also may cause changes to the properties and characteristics of the power that flows in the feeder 404_1. For example, a planned opening of the circuit breaker 105_1 causes transient currents on the feeder 404_1. Data from the sensor 434_1 may be analyzed to identify such transients. For example, time series data from the sensor 434_1 (current or voltage on the feeder 404_1 as a function of time) may be analyzed to identify a transient by, for example, comparing the rate of change of the current or voltage to a threshold, comparing the maximum amplitude of the current and/or voltage to a threshold, and/or determining a duration of time during which the current and/or voltage exceeds a threshold value and then comparing that determined duration to a specification. In this way, an error condition, whether caused by a fault condition or by planned maintenance or other intentional action, may be detected based on the data from the sensor apparatus 434_1.

In some implementations, the controller 450_1 determines a direction of current flow before analyzing the data from the sensor apparatus 434_1 further. In these implementations, the controller 450_1 only analyzes the data from the sensor apparatus 434_1 if there is reverse current flow is detected on the feeder 404_1.

If an error condition does not exist (630), the process 600 returns to (610) to continue monitoring the feeder 404_1 or the process 600 ends. If an error condition exists (630), then the controller 450_1 produces a command that causes the network protector 430_1 to open such that the distribution transformer 142_1 is disconnected from the feeder 404_1.

FIGS. 7A and 7B and 8A and 8B show characteristics of current flow as a function of time at a primary side of a distribution transformer that is connected to a spot network. FIGS. 7A and 7B show the current as a function of time during ordinary operating conditions with reverse power flow due to excess PV generation. FIGS. 8A and 8B show simulated data for the same spot network during a fault condition. FIG. 7A shows the magnitude of the fundamental harmonic of current that flows on the primary side of the distribution transformer as a function of time in seconds (s) when there is no fault condition but reverse power flow from excess PV generation exists. FIG. 7B shows the magnitude of the higher-order current harmonics through the $7^{th}$ harmonic as a function of time in seconds when there is no fault condition but reverse power flow from excess PV generation exists. FIGS. 7A and 7B have the same time scale. FIG. 8A shows the magnitude of the fundamental current harmonic as a function of time in seconds during a fault condition. FIG. 8B shows the magnitude of the higher-order current harmonics through the $7^{th}$ harmonic as a function of time during the fault condition. FIGS. 8A and 8B have the same time scale.

As shown by comparing FIG. 7A to FIG. 8A and by comparing FIG. 7B to FIG. 8B, the current harmonics have different characteristics during ordinary operation (even with reverse power flow) than in the presence of the fault. For example, the profile of the amplitude of the current harmonics over time has a different shape during normal operation than when a fault is present. In another example, the amplitude of the current harmonics are different during normal operation than when a fault is present. The amplitude of the higher-order current harmonics (FIG. 8B) during the fault condition is generally greater than the amplitude of the higher-order current harmonics under ordinary conditions (FIG. 7B).

The process 600 uses such characteristics to distinguish between normal operation and a fault condition instead of assuming that reverse power flow always indicates that a fault is present. In this way, the network protectors 430_1 and 430_2 (and other network protectors implemented with a controller that performs the process 600) allow reverse power flow in a secondary network so long as a fault condition is not present. This capability reduces service outages, and allows the network protectors 430_1 and 430_2 to be used in secondary networks that are fed by more than one independent AC power source and/or secondary networks that include DERs.

These and other implementations are within the scope of the claims.

What is claimed is:

1. A network protector comprising:
a resettable switching apparatus configured to control an electrical connection between a first distribution transformer and a first electrical feeder of a secondary electrical distribution network;
a sensor apparatus configured to sense one or more properties of electrical power in the first electrical feeder; and
a controller configured to:
determine whether reverse power flow exists in the first electrical feeder,
analyze one or more of the sensed properties of the electrical power in the first electrical feeder to determine whether an error condition exists in the secondary electrical distribution network;
open the resettable switching apparatus if an error condition exists; and
maintain the resettable switching apparatus in a closed state if an error condition does not exist regardless of whether reverse power flow exists such that the network protector allows bi-directional current flow in the absence of an error condition.

2. The network protector of claim 1, wherein the error condition comprises one or more of a fault condition or a maintenance condition.

3. The network protector of claim 1, wherein the one or more sensed properties comprise one or more properties of electrical current that flows in the first electrical feeder.

4. The network protector of claim 3, wherein the one or more properties of the electrical current comprise a magnitude of one or more frequency harmonics of the electrical current, and the controller is configured to determine that the reverse power flow is from an error condition if the magnitude of one or more frequency harmonics exceeds a threshold value.

5. The network protector of claim 4, wherein the electrical current comprises reverse current flow generated by a distributed energy resource, and the controller is configured to open the resettable switching apparatus only if the one or more properties of the reverse power flow indicate that the error condition exists.

6. The network protector of claim 3, wherein the one or more properties of the electrical current comprise a characteristic of a transient of the electrical current.

7. The network protector of claim 1, wherein the controller is configured to analyze the one or more sensed properties only if reverse power flow exists in the first electrical feeder.

8. The network protector of claim 1, wherein the first electrical feeder is configured to be electrically connected to one or more distributed energy resources.

9. The network protector of claim 1, wherein the first electrical feeder is configured to be electrically connected to an energy source that is also electrically connected to a second electrical feeder of the secondary electrical distribution network, and the first electrical feeder and the second electrical feeder are electrically connected to the same load.

10. A system comprising:
a first network protector configured to control an electrical connection between a first distribution transformer and a first electrical feeder of a secondary electrical distribution network, the first network protector comprising:
a first resettable switching apparatus;
a first sensor apparatus configured to sense one or more properties of electrical power in the first electrical feeder; and
a first controller configured to analyze one or more of the sensed properties of the electrical power in the first electrical feeder to determine whether an error condition exists in the secondary electrical distribution network; and
a second network protector configured to control an electrical connection between a second distribution transformer and a second electrical feeder of the secondary electrical distribution network, the second network protector comprising:
a second resettable switching apparatus;
a second sensor apparatus configured to sense one or more properties of electrical power in the second electrical feeder; and
a second controller configured to analyze one or more of the sensed properties of the electrical power in the first electrical feeder to determine whether an error condition exists in the secondary electrical distribution network,
wherein the first electrical feeder and the second electrical feeder are configured to electrically connect to the same load.

11. The system of claim 10, wherein the error condition comprises one or more of a fault condition or a maintenance condition.

12. The system of claim 10, wherein the one or more sensed properties comprise one or more properties of electrical current that flows in the first electrical feeder.

13. The system of claim 12, wherein the one or more sensed properties of the electrical power in the first electrical feeder comprise a frequency characteristic of the electrical current in the first electrical feeder, and the one or more sensed properties of the electrical power in the second electrical feeder comprise a frequency characteristic of the electrical current in the second electrical feeder.

14. The system of claim 13, wherein the frequency characteristic of the electrical current in the first electrical feeder comprises an amplitude of one or more harmonic components of the electrical current in the first electrical feeder, and the frequency characteristic of the electrical current in the second electrical feeder comprises an amplitude of one or more harmonic components of the electrical current in the second electrical feeder.

15. The system of claim 10, further comprising a first circuit breaker configured to control an electrical connection between the first distribution transformer and an AC power source, and a second circuit breaker configured to control an electrical connection between the second distribution transformer and the same AC power source.

16. The system of claim 10, further comprising a first circuit breaker configured to control an electrical connection between the first distribution transformer and a first AC power source, and a second circuit breaker configured to control an electrical connection between a second AC power source that is distinct from the first AC power source.

17. The system of claim 10, wherein the first controller is further configured to:
determine whether reverse current flow exists in the first electrical feeder based on the one or more sensed properties of electrical power in the first electrical feeder; and analyze the one or more sensed properties of electrical power in the first electrical feeder to determine whether an error condition exists in the secondary electrical distribution network only if reverse current flow exists in the first electrical feeder; and
the second controller is further configured to: determine whether reverse current flow exists in the first electrical feeder based on the one or more sensed properties of electrical power in the first electrical feeder; and analyze the one or more sensed properties of electrical power in the first electrical feeder to determine whether an error condition exists in the secondary electrical distribution network only if reverse current flow exists in the first electrical feeder.

18. The system of claim 10, wherein the load comprises at least one device configured to generate electrical energy.

19. The system of claim 18, wherein each of the first network protector and the second network protector are configured to allow bi-directional current flow in the absence of an error condition in the secondary electrical distribution network.

20. A network protector comprising:
a resettable switching apparatus configured to control an electrical connection between a first distribution transformer and a first electrical feeder of a secondary electrical distribution network;
a sensor apparatus configured to sense one or more properties of electrical power in the first electrical feeder; and
a controller configured to:
analyze one or more of the sensed properties of the electrical power in the first electrical feeder to determine whether an error condition exists in the secondary electrical distribution network; and
open the resettable switching apparatus if an error condition exists, wherein the first electrical feeder is configured to be electrically connected to one or more distributed energy resources.

21. The network protector of claim 20, wherein the controller is further configured to determine whether reverse power flow exists in the first electrical feeder and to maintain the resettable switching apparatus in a closed state in the presence of reverse power flow such that network protector allows bi-directional current flow in the absence of an error condition in the secondary electrical distribution network.

* * * * *